Nov. 23, 1965     G. W. McININCH ETAL     3,218,888
AUXILIARY TRANSMISSION FOR TRACTOR SLOW DRIVE
Filed April 2, 1962     2 Sheets-Sheet 1
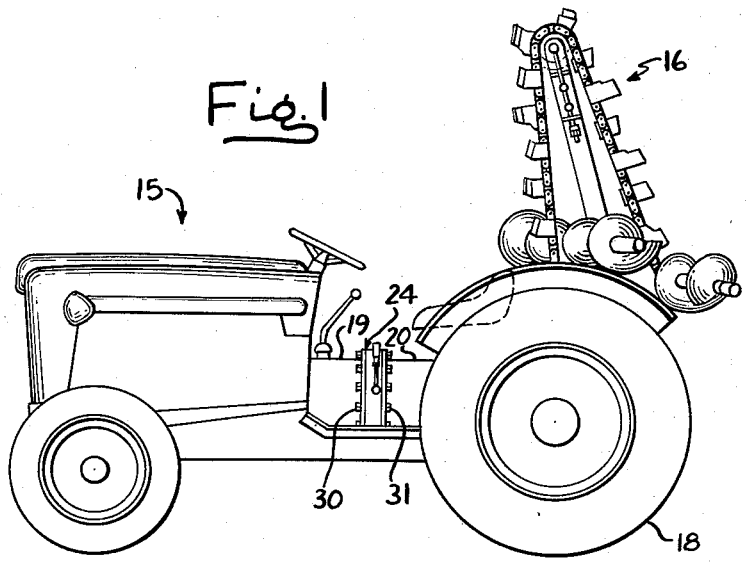
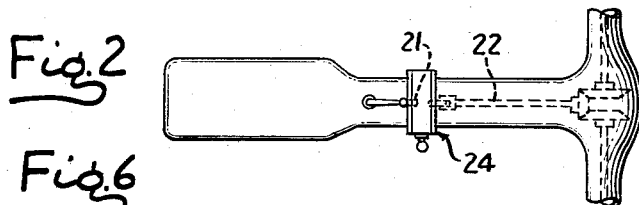
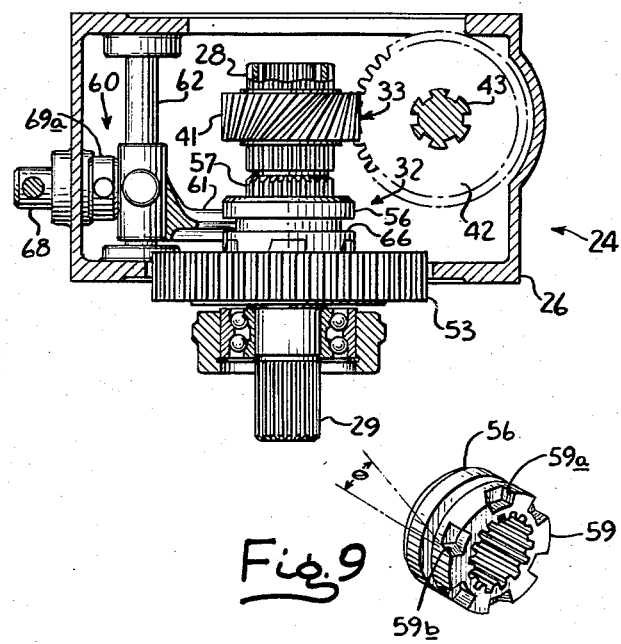
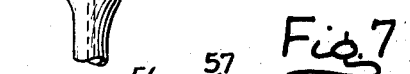
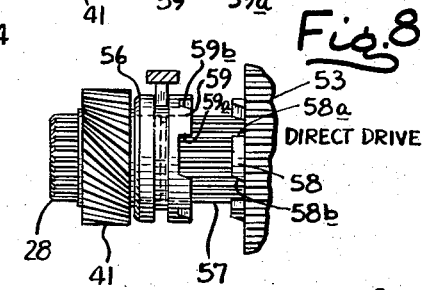
INVENTORS
GLENN W. McININCH
DONALD F. ROSTERMAN
BY Wolfe, Hubbard, Voit & Osann
ATTYS.

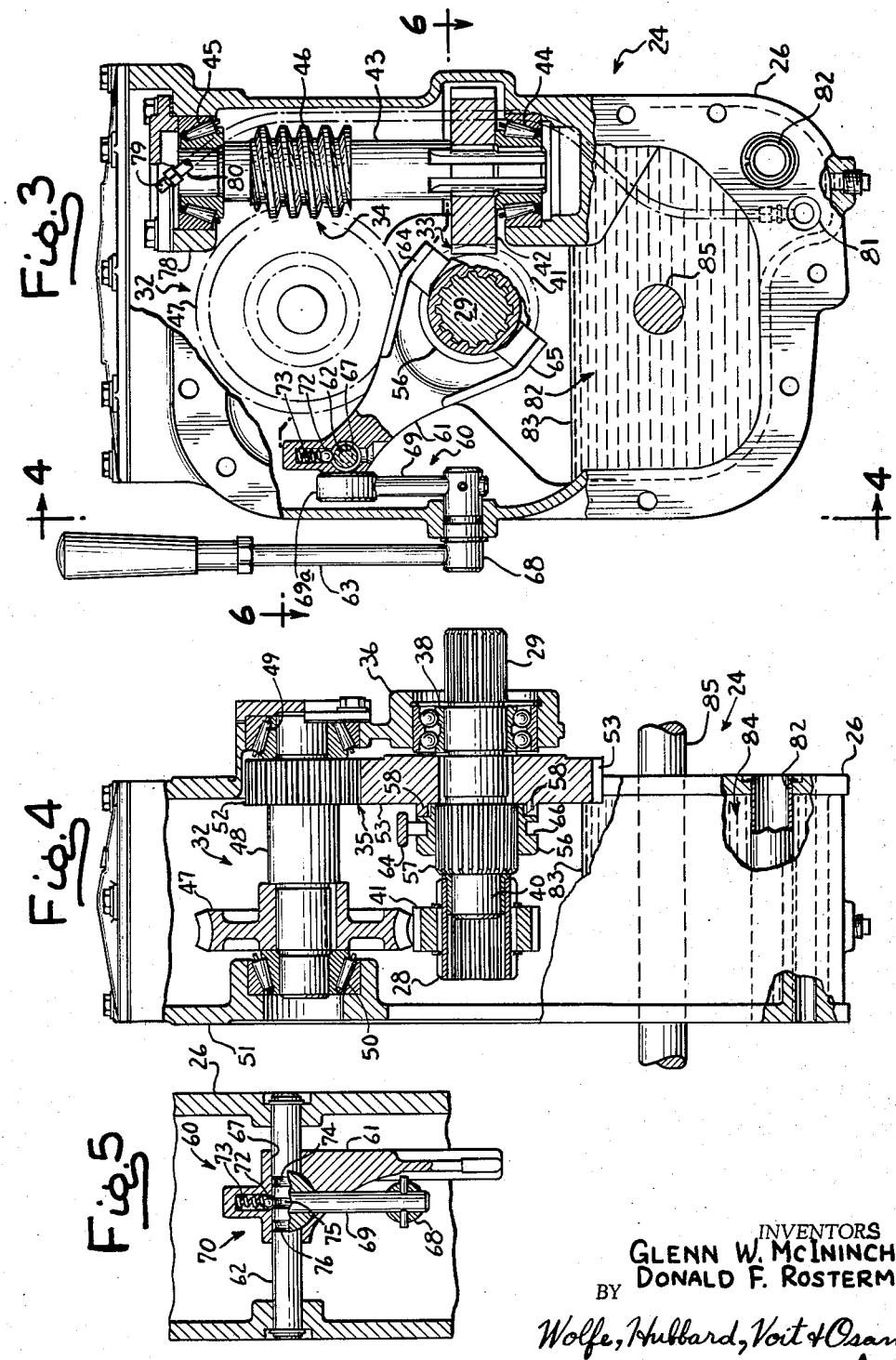

United States Patent Office 3,218,888
Patented Nov. 23, 1965

1

3,218,888
AUXILIARY TRANSMISSION FOR TRACTOR
SLOW DRIVE
Glenn W. McIninch, Omaha, and Donald F. Rosterman, Auburn, Nebr., assignors to Auburn Machine Works, Inc., Auburn, Nebr., a corporation of Nebraska
Filed Apr. 2, 1962, Ser. No. 184,414
9 Claims. (Cl. 74—745)

The present invention relates to a tractor transmission attachment permitting slow speed drive of the tractor, and more particularly to an improved mechanism for conducting power to the tractor drive shaft to obtain the slow crawling speed required for trenching and similar operations.

Attachments for standard tractor transmisisons have been provided to accomplish extreme speed reductions in ratios of the order of 100:1. In some of these speed reducing mechanisms an additional drive shaft disposed outside the tractor transmission housing is required to transmit drive through the rear of the tractor differential. In other types the mechanism is fully enclosed but the length of the tractor is substantially increased. The latter decreases maneuverability and upsets the design considerations for maintaining the tractor controls at the fingertips of the operator. Furthermore, ordinary speed reducing gearing tends to encourage reciprocating or bucking motion of the tractor under difficult trenching conditions because of retrograde transfer of torque through the transmission from the tractor rear wheels.

Also, in all of these attachments the standard lubricating systems for the transmission and differential are disrupted and wear occurs in the transmission attachment or, to handle the problem, an independent lubricating system for the attachment is necessary.

It is an object of the present invention to provide a speed reducing auxiliary transmission utilizing a novel gear arrangement to obtain extreme speed reduction within a compact space. A related object of the present invention is to provide a gear arrangement offering a wide range of speed redu tion gear ratios selectable in small steps. It is an object to provide such speed reduction in an auxiliary transmission manufacturable at low cost and installable into the standard tractor rear wheel drive mechanism by simple substitution of parts. It is a related object to provide such an auxiliary transmission without substantially lengthening the tractor or weakening its framework so that the tractor can still be utilized for normal agricultural purposes. It is an object along these lines to include gearing in the auxiliary transmission which is non-retrograde, in that it does not allow torque transfer back through the auxiliary transmission so as to permit operation free of the bucking sometimes experienced, even under the most difficult trenching operations.

It is also an object of the present invention to provide a non-retrograde driving connection including a clutch for selectively applying reduced speed drive or straight through drive to the tractor differential which does not "lock up," the clutch providing easy power disconnect upon being driven in a reverse or normally non-operating direction. Along these lines it is an object of the present invention to provide a clutch with easy power disconnect which also can transmit low power in a reverse or normally non-operating direction for special trenching operations.

It is another object of the present invention in accordance with the above to provide straight through operation of the tractor power-take-off drive, the standard PTO shaft need be lengthened only by an amount equal to the length dimension of the auxiliary transmission.

It is an added object of the present invention in accordance with the above to provide a system for positively lubricating the auxiliary transmission which is integrated into existing hydraulic systems of tractors.

It is an overall object of the present invention to provide an auxiliary transmission of the above type which is light and convenient to install yet strong and has a long life.

Other objects and advantages of the invention will become apparent upon reading the following detailed discussion and upon reference to the attached drawings in which:

FIGURE 1 is an elevation of a tractor, carrying a trenching attachment, which embodies the present invention;

FIG. 2 is a schematic plan view of the construction showing the driving power train;

FIG. 3 is an elevation of the speed reducing auxiliary transmission partially in section;

FIG. 4 is a vertical section taken substantially along 4—4 in FIG. 3;

FIG. 5 is a fragmentary section showing the clutch detent assembly;

FIG. 6 is a horizontal section taken substantially along the line 6—6 in FIG. 3;

FIG. 7 is a fragmentary elevation of the clutch assembly in neutral;

FIG. 8 is a fragmentary elevation with the clutch assembly in a straight through drive position; and FIG. 9 is a perspective of the shiftable clutch spool constructed in accordance with the present invention.

While the invention will be described in connection with a preferred embodiment, it will be understood that we do not intend to limit the invention to that embodiment, but, on the contrary we intend to cover such alternative embodiments as may be included within the spirit and scope of the appended claims.

Turning first to FIG. 1 there is shown a tractor 15 with a trench digging attachment 16 mounted on the rear. The tractor 15 includes a set of propelling rear wheels 18 driven through a transmission 19 and differential 20. The tractor rear wheel drive mechanism includes a transmission output shaft 21 coupled to a differential drive shaft 22. For powering the trench digging attachment 16 the tractor 15 includes a power takeoff mechanism (not shown).

In carrying out the present invention a compact auxiliary transmission 24 is sandwiched between the transmission 19 and differential 20 of the standard tractor 15 for selectively providing, either reduced speed drive of the tractor rear wheels 18 over a wide choice of closely spaced step-down gear ratios to effectuate inching tractor movement required for trenching or other special usage or straight through rear wheel drive for ordinary tractor operation. In the present instance as shown in FIG. 3 and FIG. 4, the operating mechanism includes a generally rectangular shaped supporting frame member 26 surrounding end portions of an input shaft in the form of a splined sleeve 28 and an output shaft 29. The frame 26 is fastened by suitable means such as bolts 30, 31, to the transmission and differential housings, respectively. Enclosed within the frame 26 and coupled to the input and output shafts 28, 29, respectively, is a speed reducing gear train 32 adapted to provide speed reduction at three points 33, 34 and 35.

Explaining the compact arrangement of the speed reduction gear train 32, the auxiliary transmission output shaft 29 is journalled in a laterally projecting bearing support, here shown as an integral wall 36 forming a pocket in the upper portion of frame 26 for receiving a bearing 38. Input shaft or sleeve 28 is rotatably telescoped over a reduced diameter end portion 40 of output shaft 29. For driving the gearing 32 from the tractor transmission output shaft 21, a 90° angle gear is mounted on the splined outside surface of input sleeve 28. Meshing at 33 with gear 41 is a second angle gear 42 disposed in a horizontal plane as viewed in FIG. 3 and mounted on a splined vertical shaft 43. Thus meshing helical gear teeth on driving gear 41 and driven gear 42 change the direction of torque transmittal from horizontal to vertical. In the preferred embodiment shaft 43 extends along one side of frame 26 and is journalled in lower and upper bearings 44, 45, respectively.

In order to provide extreme speed reduction within a small space an integral worm thread 46 is provided on the upper portion of shaft 43 and meshes at 34 with a worm gear 47. The latter is keyed to a horizontal stub or cross shaft 48 rotatably journalled in bearings 49, 50, in the present instance supported, respectively at one end in the integral wall 36 and at the other end in a partial depending wall 51.

For transmitting speed reduction drive from worm gear 47 so it can be applied to output shaft 29 and also to offer additional gearing for achieving speed reduction, a spur gear 52 integral with and at the opposite end of cross shaft 48 is maintained in mesh at 35 with a spur gear 53 rotatably mounted upon output shaft 29.

For selectively driving output shaft 29 through speed reducing gearing 32, a clutch spool 56 is slidably mounted on a splined portion 57 of the output shaft 29 and adapted to drivingly engage with the spur gear 53. To this end, the gear 53 and clutch spool 56 are provided with engaging dogs 58, 59, respectively. These gear and clutch spool dogs when engaged have juxtaposed reverse driving faces 58b, 59b, respectively, inclined at a predetermined angle $\theta$ measured from the central axes of output shaft 29. The inclined normally non-driving or reverse operation faces are a feature of the present invention which shall be explained subsequently. It is clear that when the dogs 58, 59 are engaged, torque is transmitted from gear 53 through clutch spool 56 splined to output shaft 29 and thereby to the differential drive shaft 22.

To obtain straight through drive of the differential shaft 22 by tractor transmission shaft 21 through the auxiliary transmission 24, the outside surface of input sleeve 28 is matchingly splined and abuts the splined portion 57 of output shaft 29. Straight through drive is effected by sliding clutch spool 56 over the outside splined end portion of input sleeve 28. It is clear that in this position spool 56 positively couples input sleeve 28 and output shaft 29.

For neutralizing output drive from transmission 19, clutch spool 56 is slid to a neutral position on the splined portion 57 of output shaft 29 wherein it neither engages the spur gear dogs 58 nor couples the shafts 28, 29.

For positioning the clutch spool 56 to selectively obtain speed reduction drive, neutral or straight through drive of the tractor rear wheels 18, a clutch handle assembly 60 is provided. In the present instance the assembly 60 includes a shifter member 61 slidable on a rail 62 and pivotably linked to an operator's handle 63 at the side of frame 26. The shifter member 61 is provided, at its lower end as viewed in FIG. 3 with forks 64, 65 received in a clutch spool groove 66 so that the spool 56 can be selectively slid to the three positions and is also free to rotate. At the upper end the shifter member is provided with an opening 67 so that it can be slipped onto the rail 62 supported at either end in opposite frame walls, 36, 51, respectively. The handle 63 is linked to the shifter member 61 so as to slidably move the latter along rail 62. The linkage includes a stub shaft 68 rotatably mounted in the side frame 26 and extending within the enclosure of the frame and a linking shaft 69 extending upwardly to connect with a pivot block 69a attached to the shifter member 61.

So as to provide detent positions to positively hold the clutch spool 56 in any of the three desired positions, speed reduction drive, neutral or straight through drive, a detent assembly 70 is provided at the upper end of the shifter member 61. The assembly 70 takes the form in the present instance as best shown in FIG. 5, of a spring biased ball 72 received in a recess 73 in the upper portion of shifter member 61 and three grooves 74, 75 and 76 in the rail 62 for receiving the ball 72. It can be seen by viewing FIG. 5 that as handle 63 is moved the shifter member 61 will be guided along rail 62 and will detent at the three positions where the ball 72 catches in the grooves 74, 75 and 76. Summarizing the operation of the clutch handle assembly 60, the clutch spool 56 moves with movement of the shifter member 61. When the latter is moved by handle 63 so the ball 72 and groove 74 cooperate to detent the shifter member 61 the clutch spool 56 is engaged with gear 53 to provide speed reduction drive (FIG. 4). When the ball 72 is in groove 75, a neutral position is achieved with the clutch spool riding disengaged on the output shaft 29 (FIG. 7). With handle 63 swinging so as to put ball 72 in groove 76, input shaft 28 and output shaft 29 are coupled through spool 56 for straight through drive (FIG. 8).

It is one of the features of the present device that torque can be transmitted in one direction only, from the worm thread 46 to the worm gear 47. Thus, any tendency of the tractor rear wheels 18 to rebound, as, for example, when an obstruction is met by the trenching tool 16, is overcome in the auxiliary transmission. This does away with bucking action which characterizes some trenchers, especially when operating in difficult terrain.

With the elimination of retrograde torque transfer through the auxiliary transmission, there is a tendency for the speed reducing gear train 32 to "lock up." Thus when the trencher 16 meets an overloading obstruction the trencher is stopped which may stall the tractor engine. As the speed reducing gears have been transmitting a large torque because of the extreme speed reduction, the gears and shafts in the auxiliary transmission 24 are under tremendous twisting load. Consequently, there is energy stored in the tractor rear wheel drive mechanism. A reverse rotation of the drive mechanism would allow dissipation of this energy. However, because the worm gearing does not allow torque transfer back through from the tractor differential, the gearing remains under load or "locked up."

In accordance with the present invention there is provided between the point 34 where the worm gears mesh and the output shaft 29, a dog type clutch having axially aligned power transmitting faces 58a, 59a, as will transmit forward drive, and angling of normally non-driving power transmitting back faces 58b, 59b, as will transmit reverse drive when the dogs are held in drive position by the detent, the angling of the back faces allowing easy power disconnect and preventing "lock up" when the speed reducing gears 32 are operated.

In the present instance (as best shown in FIGS. 7, 8, 9) the back faces 58b, 59b, are inclined at a predetermined angle $\theta$ in respect of the axis of output shaft 29. The assembly 71, explained earlier for positively detenting the shifter member 61 in position, serves to hold the dogs 58, 59 engaged so that the faces 58b, 59b, do not wipe out of engagement. Accordingly, it is possible to obtain speed reduction drive in reverse for special trenching operations, for example digging under obstructions such as sidewalks, trees, roots and the like. By providing the detent assembly 70, angle $\theta$ can be larger than would be allowable without the positive detenting and thereby, with a larger angle $\theta$, power can be disconnected easily with handle 63 simply by operating the speed reduction gearing in reverse to release the load on the forward driving faces 58a, 59a. Angle $\theta$ is limited at an upper value at which the respective gear and clutch spool dogs automatically disengage or wipe out during reverse operation, and a lower value at which the faces of the respective dogs cannot be easily slid apart with reverse operation of the speed reducing gearing. Of course the clutch spool can be detented to some degree by an operator holding handle 63 in speed reduction drive position during reverse operation of the speed reduction gears 32. In practice, an angle θ of aproximately 21 degrees has been used.

Another feature of the present invention is the structure for positively providing lubrication of the speed reducing mechanism and integrating such lubricating structure into the sources of lubricant already present in the tractor. Ti this end, in the preferred embodiment of FIG. 3 a housing 78 is provided surrounding the upper bearing 44 of worm thread shaft 43. The housing 78 has a connection through a suitable port 80 with the tractor hydraulic system. The port 80 is connected to a tractor hydraulic pump output pipe 81. A return hydraulic pipe 82 is shown. During operation lubricant is forced under pressure into the housing 78 where bearing 44 is lubricated. The oil escapes from the housing 78 and flows to the bottom of the auxiliary transmission.

As shown in FIG. 3, when the auxiliary transmission 24 is operating sandwiched between the tractor transmission 19 and differential 20, the level of hydraulic fluid which is also lubricant for the auxiliary transmission is at a height 83. In regular operation a pair of walls (not shown) provide a compartment between transmission 19 and differential 20 to form a reservoir for hydraulic fluid. The present auxiliary transmission increases the size of this reservoir and utilizes the hydraulic fluid for lubrication. The normal tractor hydraulic system is not disrupted, it is merely necessary to add more hydraulic fluid.

Emphasizing another feature of the present invention, as can be seen in FIGS. 3 and 4, respective frame end walls 36, 51 used for support purposes, do not depend to the bottom of the frame 26 so as to enclose the frame ends. Instead they are partial walls thereby providing the opening 84 extending longitudinally through the auxiliary transmission 24. As outlined above, this maintains the integrity of the hydraulic reservoir by allowing free flow of the hydraulic fluid. It is a further feature of the invention in that it allows a PTO drive shaft 85 to extend therethrough. Thus the PTO mechanism in the tractor is maintained operative simply by providing a PTO shaft 85 longer by the length of frame 26.

As another feature of the present invention, a wide range of speed reduction value are selectable in small steps between a limit value of 1:1 to ratios in the order of 100:1 because of the provision for choosing gear ratios at three points, 33, 34 and 35. The relative size of gears meshing at each of these points can be adjusted in combination with adjustments at the other two points to choose speed reduction over a range of speeds. Or by interchanging gears at any of the three points, step changes in speed reduction can be achieved. This provides the necessary versatility in a tractor speed reducing mechanism for a variety of trenching operations depending upon type of soil, its condition and the like.

Though the frame 26 has a profile adapted for use with a particular tractor transmission and differential housing construction, the frame can be fitted to other tractor drive mechanism housings. With simple adjustments the speed reducing gearing can be used in substantially all standard tractors.

It is clear from the foregoing description that the auxiliary transmission 24 provides extreme speed reduction within a compact space. This is in part due to the overhanging wall 36 which encloses gearing and extends into available space in the tractor differential. The present inventive construction of gearing for speed reduction has decreased the necessary length of the auxiliary transmissions by as much as 40%. Accordingly, the operator controls on the tractor are maintained within easy reach from the driver's seat.

The transmission is simply installable by breaking the tractor drive mechanism at a convenient point, i.e. the existing coupling point between the transmission and differential of a standard tractor. In addition, it provides enclosure of all parts and maintains the streamline arrangement of the tractor drive mechanism housing. As a result, the tractor having the auxiliary transmission installed can be utilized either for trenching operations and like slow speed use or for ordinary agricultural operations such as drawing a plow or combine and other regular speed uses. Because of the compact construction and minimum use of parts to achieve extreme speed reduction, auxiliary transmission 24 is economical to construct, comparatively light for convenient installation, yet inherently durable for long life and low maintenance costs.

In the following claims the term "spur gears" shall be understood to mean a pair of meshing gears having parallel shafts. The term "spline connection" shall be understood to mean a connection between two members which permits axial shifting movement while maintaining a rotational drive connection between them. The term "detent" shall be understood to means means for inhibiting movement between the two members which can be overcome by intentional action.

We claim as our invention:

1. In an auxiliary transmission for selectively providing speed reduction drive or straight through drive between axially aligned input and output shafts, the combination comprising, a first helical gear mounted on said input shaft, a second helical gear meshed with and at right angles to said first helical gear, a thread worm secured to and coaxial with said second helical gear, a worm gear meshed with said thread worm and journaled parallel to the input and output shafts, a first spur gear coupled for rotation with said worm gear, a second spur gear rotatably journaled on the output shaft and engaged with said first spur gear, and a clutch spool mounted on the output shaft and being axially shiftable for directly coupling the output shaft to the input shaft when slid in one direction for straight through drive and for locking said second spur gear to the output shaft when slid in the other direction for speed reduction drive.

2. In an auxiliary transmission for selectively providing speed reduction drive or straight through drive between axially aligned input and output shafts, the combination comprising, a first angle gear mounted on said input shaft, a second angle gear meshed with and at right angles to said first angle gear, a thread worm secured to and coaxial with said second angle gear, a worm gear meshed with said thread worm and journaled parallel to the input and output shafts, a first spur gear coupled for rotation with said worm gear, a second spur gear rotatably journaled on the output shaft and engaged with said first spur gear, and a clutch member shiftably mounted on the output shaft for shiftable movement to a first position locking said second spur gear to the output shaft and to a second position locking the axially alined input and output shafts for simultaneous rotation.

3. In an auxiliary transmission for selectively providing speed reduction drive or straight through drive between axially alined input and output shafts, the combination comprising, a first helical gear mounted on said input shaft, a second helical gear meshed with and at right angles to said first helical gear, a thread worm secured to and coaxial with said second helical gear, a worm gear meshed with said thread worm and journaled parallel to the input and output shafts, a first spur gear coupled for rotation with said worm gear, a second spur gear journaled on the output shaft and engaged with said first spur gear, said second spur gear having integral spaced dogs with a set of straight faces for forward operation and a set of inclined faces for reverse operation, and a clutch member shiftably mounted on the output shaft and having an integral set of dogs with straight faces for forward operation and a set of inclined faces for reverse operation, said clutch member dogs drivingly engaging with said spur gear dogs, said spur gear dogs and clutch member dogs having said faces for reverse operation inclined at a predetermined angle to a common axis.

4. In an auxiliary transmission for selectively providing speed reduction drive or straight through drive between axially aligned input and output shafts mounted in a standard tractor between a transmission housing and a differential housing having a hydraulic fluid reservoir therebetween, the combination comprising, a source of lubricant under pressure within the tractor housings, a frame with top and bottom portions and having opposite ends secured respectively to the transmission housing and to the differential housing, said frame bottom portion cooperating with said housings to define a reservoir for hydraulic fluid, speed reducing gearing between input and output shafts, said gearing including a thread worm and a worm gear journaled within said frame and disposed to transmit power from the input shaft to the output shaft, a spur gear rotably journaled on the output shaft, a clutch spool mounted on the output shaft and being axially shiftable for directly coupling the shafts when slid in one direction for straight through drive and for locking said spur gear to the output shaft when slid in the other direction for speed reduction drive, and means for lubricating said gearing by conveying lubricant under pressure from said source to said journaled thread worm in said frame top portion.

5. In an auxiliary transmission for selectively providing speed reduction drive or straight through drive between axially aligned input and output shafts and adapted for use with a tractor having a PTO shaft, the combination comprising, a frame having opposite ends and adapted to suround end portions of the input and output shafts, a first helical gear mounted on said input shaft, a second helical gear meshed with and at right angles to said first helical gear, a thread worm secured to said second helical gear and rotatably journaled along one of said frame ends, a worm gear meshed with said thread worm and journaled parallel to said shafts in said frame opposite ends, a first spur gear coupled for rotation with said worm gear, a second spur gear rotatably journaled on the output shaft, a clutch member mounted on said output shaft and being axially shiftable for directly coupling the input and output shafts when slid in one direction for straight through drive and for locking said second spur gear to said output shaft when slid in the other direction for speed reduction drive, and partial walls at said frame opposite ends to provide an opening for extending the PTO shaft through the auxiliary transmission.

6. An auxiliary transmission for a tractor having separable transmission and differential housings and a drive shaft extending therethrough at the junction of said housings comprising in combination, a frame having a profile corresponding substantially to the profile of said housings and having parallel opposite end faces for respective securing to said housings, input and output shafts of said auxiliary transmission arranged coaxially for engagement with the respective ends of the separated drive shaft in the tractor transmission and differential housings, a first helical gear mounted on the input shaft, a second helical gear meshed therewith and having a shaft arranged at right angles to the shaft of the first helical gear to extend in a direction parallel to the end faces, a thread worm on the shaft of said second helical gear, a worm gear meshed with said thread worm having a shaft journaled in the ends of said frame and arranged parallel to the output and input shafts, said worm gear being positioned on the side of said thread worm which lies in the direction of the input and output shafts, a first spur gear on the end of said gear shaft, a second spur gear rotatably mounted on the output shaft, said input and output shafts having matching splines, a splined collar mounted thereon, clutch dogs on the adjacent ends of said collar and said second spur gear so that when the collar is in one extreme position the second spur gear is directly coupled to the output shaft and so that when the collar is in its opposite extreme position the dogs are disengaged and the input and output shafts are bridged for direct drive, and means including a manual operator mounted on said frame and accessible to the operator of the tractor for shifting the splined collar between its extreme positions.

7. An auxiliary transmission for a tractor having separable transmission and differential housings and a drive shaft extending therethrough at the junction of said housings comprising in combination, a frame having a profile corresponding substantially to the profile of said housings and having parallel opposite end faces for respective securing to said housings, input and output shafts of said auxiliary transmission arranged coaxially for engagement with the respective ends of the separated drive shaft in the tractor transmission and differential housings, a first helical gear mounted on the input shaft, a second helical gear meshed therewith and having a shaft arranged at right angles to the shaft of the first helical gear to extend in a direction parallel to the end faces, a thread worm on the shaft of said second helical gear, a worm gear meshed with said thread worm having a shaft journaled in the ends of the frame and arranged parallel to the output and input shafts, said worm gear being positioned on the side of said thread worm which lies in the direction of the input and output shafts, a first spur gear on the end of said worm gear shaft, a second spur gear rotatably mounted on the output shaft, said input and output shafts having matching splines, a splined collar mounted thereon, clutch dogs on the adjacent ends of said collar and said second spur gear so that when the collar is in one extreme position the second spur gear is directly coupled to the output shaft and so that when the collar is in its opposite extreme position the dogs are disengaged and the input and output shafts are bridged for direct drive, inclined juxtaposed faces on said dogs engageable for transmitting drive in a reverse direction when said collar is in said first extreme position, and means including a manual operator mounted on said frame and accessible to the operator of the tractor for shifting the splined collar between its extreme positions.

8. An auxiliary transmission for a tractor having separable transmission and differential housings and a drive shaft extending therethrough at the junction of said housings comprising in combination, a frame having a profile corresponding substantially to the profile of said housings and having parallel opposite end faces for respective securing to said housings, input and output shafts of said auxiliary transmission arranged coaxially for engagement with the respective ends of the separated drive shaft in the tractor transmission and differential housings, a first helical gear mounted on the input shaft, a second helical gear meshed therewith and having a shaft arranged at right angles to the shaft of the first helical gear to extend in a direction parallel to the end faces, a thread worm on the shaft of said second helical gear, a worm gear meshed with said thread worm having a shaft journaled in the ends of the frame and arranged parallel to the output and input shafts, said worm gear being positioned on the sides of said thread worm which lies in the direction of the input and output shafts, a first spur gear on the end of said worm gear shaft, a second spur gear rotatably mounted on the output shaft, said input and output shafts having matching splines, a splined collar mounted thereon, clutch dogs on the adjacent ends of said collar and said second spur gear so that when the collar is in one extreme position the second spur gear is directly coupled to the output shaft and so that when the collar is in its opposite extreme position the dogs are disengaged and the input and output shafts are bridged for direct drive, inclined juxtaposed faces on said dogs engageable for transmitting drive in reverse when said collar is in said first extreme position, means including a manual operator mounted on said frame and accessible to the operator of the tractor for shifting the splined collar between its extreme positions, and detenting means cooperating with said manual operator for shifting said collar to maintain said dogs in position, notwithstanding the transmission of torque in a reverse direction by said dogs through said inclined faces.

9. An auxiliary transmission for a tractor having separable transmission and differential housings and a drive shaft extending therethrough at the junction of said housings comprising in combination, a frame having a profile corresponding substantially to the profile of said housings and having parallel opposite end faces for respective securing to said housings, input and output shafts of said auxiliary transmission arranged coaxially for engagement with the respective ends of the separated drive shaft in the tractor transmission and differential housings, a first helical gear mounted on the input shaft, a second helical gear meshed therewith and having a shaft arranged at right angles to the shaft of the first helical gear to extend in a direction parallel to the end faces, a thread worm on the shaft of said second helical gear, a worm gear meshed with said thread worm having a shaft journaled in the ends of the frame and arranged parallel to the output and input shafts, said worm gear being positioned on the side of said thread worm which lies in the direction of the input and output shafts, a first spur gear on the end of said worm gear shaft, a second spur gear rotatably mounted on the output shaft, said input and output shafts having matching splines, a splined collar mounted thereon, clutch dogs on the adjacent ends of said collar and said second spur gear so that when the collar is in one extreme position the second spur gear is directly coupled to the output shaft, when the collar is in its opposite extreme position the dogs are disengaged and the input and output shafts are bridged for direct drive, and when the collar is in an intermediate neutral position said output shaft is idle, and means including a manual operator mounted on said frame and accessible to the operator of the tractor for shifting the splined collar between its extreme positions.

References Cited by the Examiner
UNITED STATES PATENTS

| | | | |
|---|---|---|---|
| 1,442,788 | 1/1923 | Scheminger | 74—467 X |
| 1,482,332 | 1/1924 | Weren | 74—425 |
| 2,037,890 | 4/1936 | Dow | 74—425 X |
| 2,638,010 | 5/1953 | De Vlieg | 74—333 X |
| 3,049,930 | 8/1962 | Porsche et al. | 74—15.84 |

DON A. WAITE, *Primary Examiner.*